(12) United States Patent
Wu et al.

(10) Patent No.: US 11,249,376 B2
(45) Date of Patent: Feb. 15, 2022

(54) PROJECTOR AND LENS ADJUSTING MODULE

(71) Applicant: Coretronic Corporation, Hsin-Chu (TW)

(72) Inventors: Chun-Hsien Wu, Hsin-Chu (TW); Kuang-Yao Liu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/920,762

(22) Filed: Jul. 6, 2020

(65) Prior Publication Data

US 2021/0011360 A1  Jan. 14, 2021

(30) Foreign Application Priority Data

Jul. 11, 2019 (CN) .......................... 201910624189.4

(51) Int. Cl.
  *G03B 21/14* (2006.01)
(52) U.S. Cl.
  CPC ................................. *G03B 21/142* (2013.01)
(58) Field of Classification Search
  None
  See application file for complete search history.

(56) References Cited

FOREIGN PATENT DOCUMENTS

| CN | 1758090 | 4/2006 | | |
|---|---|---|---|---|
| CN | 102053465 | 5/2011 | | |
| CN | 102645725 | 8/2012 | | |
| CN | 102902141 | 1/2013 | | |
| CN | 104730817 | 6/2015 | | |
| CN | 102540385 | 1/2016 | | |
| CN | 208861133 | 5/2019 | | |
| CN | 210072295 | 2/2020 | | |
| KR | 19990036550 A | * | 5/1999 | ............. E05F 1/006 |

OTHER PUBLICATIONS

Office Action of China Counterpart Application, dated Jun. 30, 2021, pp. 1-5.

* cited by examiner

*Primary Examiner* — Michelle M Iacoletti
*Assistant Examiner* — Danell L Owens
(74) *Attorney, Agent, or Firm* — JCIPNET

(57) ABSTRACT

Provided are a projector and a lens adjusting module. The projector includes a main body, a light source disposed on the main body and providing an illumination beam, a light valve disposed on the main body and converting the illumination beam into an image beam, a projection lens movably disposed on the main body in a moving direction and projecting the image beam, and the lens adjusting module. The lens adjusting module includes a driven member connected to the projection lens and having a limiting flange, a limiting structure connected to the main body, and a rotating member screwed to the driven member and rotating to drive the driven member and the projection lens to move in a moving direction. The limiting structure is adapted to stop the limiting flange to limit a movement range of the driven member in the moving direction.

18 Claims, 9 Drawing Sheets

PROJECTOR AND LENS ADJUSTING MODULE

CROSS-REFERENCE TO RELATED APPLICATION

This application claims the priority benefit of China application serial no. 201910624189.4, filed on Jul. 11, 2019. The entirety of the above-mentioned patent application is hereby incorporated by reference herein and made a part of this specification.

BACKGROUND

Technical Field

The invention relates to a display device and an adjusting module thereof, in particular, to a projector and a lens adjusting module thereof.

Description of Related Art

A projector is a display device for generating a picture anytime anywhere. An imaging principle of a projector is to convert an illumination beam generated by a light source into an image beam through a light valve and then project the image beam onto a screen or a wall to form an image through a projection lens. Along with progress of projection technologies and reduction of manufacturing cost, projectors have gradually been extended from commercial uses to domestic purposes.

For enabling a user to change a height of a projection picture, the projection lens is adjusted to ascend and descend through a knob in some projectors. Such an adjusting manner is to connect the knob to the projection lens in a screwing manner and rotate the knob to drive the projection lens to ascend and descend. When the projection lens ascends or descends along with rotation of the knob to contact with a stopping structure (for example, a limiting screw for limiting an ascending/descending travel of the projection lens), a shell structure of the projection lens may be easily deformed by interference between the projection lens and the stopping structure and a force applied by the knob, resulting in that the knob is screwed to the projection lens too tightly to rotate reversely, and deformation of the shell structure may deviate an angle or position of the projection lens from a normal state to affect the picture quality and even cause structural damage to the projection lens.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention provides a projector and a lens adjusting module thereof, which may avoid deformation of a shell structure of a projection lens.

Other objectives and advantages of the invention may be further understood from the technical features disclosed in the invention.

In order to achieve one or part or all of the aforementioned objectives or other objectives, an embodiment of the invention discloses a projector, which includes a main body, a light source, a light valve, a projection lens and a lens adjusting module. The light source is disposed on the main body and adapted to provide an illumination beam. The light valve is disposed on the main body and adapted to convert the illumination beam into an image beam. The projection lens is movably disposed on the main body in a moving direction and adapted to project the image beam. The lens adjusting module includes a driven member, a limiting structure and a rotating member. The driven member is connected to the projection lens and has a limiting flange. The limiting structure is connected to the main body. The rotating member is screwed to the driven member and adapted to rotate to drive the driven member and the projection lens to move in the moving direction. The limiting structure is adapted to stop the limiting flange to limit a movement range of the driven member in the moving direction.

In order to achieve one or part or all of the foregoing objectives or other objectives, an embodiment of the invention discloses a lens adjusting module, which is used for a projector. The lens adjusting module includes a driven member, a limiting structure and a rotating member. The driven member is connected to a projection lens of the projector and has a limiting flange. The limiting structure is connected to a main body of the projector. The rotating member is screwed to the driven member and adapted to rotate to drive the driven member and the projection lens to move in a moving direction. The limiting structure is adapted to stop the limiting flange to limit a movement range of the driven member in the moving direction.

Based on the foregoing, the embodiments of the invention have at least one of the following advantages or effects. In the lens adjusting module of the invention, the driven member with the limiting flange is arranged on the projection lens, and the rotating member is not directly screwed to the projection lens but screwed to the driven member of the projection lens. When a user applies a force to the rotating member to drive the projection lens to move through rotation of the rotating member, the limiting flange of the driven member is stopped by the limiting structure to limit a movement travel of the projection lens. That is, the driven member is screwed with the rotating member and stopped by the limiting structure, so that an acting force between the driven member and the limiting structure is directly transmitted to a screwing junction of the driven member and the rotating member and is not excessively transmitted to the shell structure of the projection lens, which can avoid the shell structure of the projection lens being stressed and deformed. In addition, the driven member and the limiting structure are components simple rather than complex in structure, and it is unnecessary to adopt a relatively expensive metal (for example, a magnesium alloy) as a high-strength material for the shell structure of the projection lens to solve the problem of deformation, so that the manufacturing cost of the projector can be reduced.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
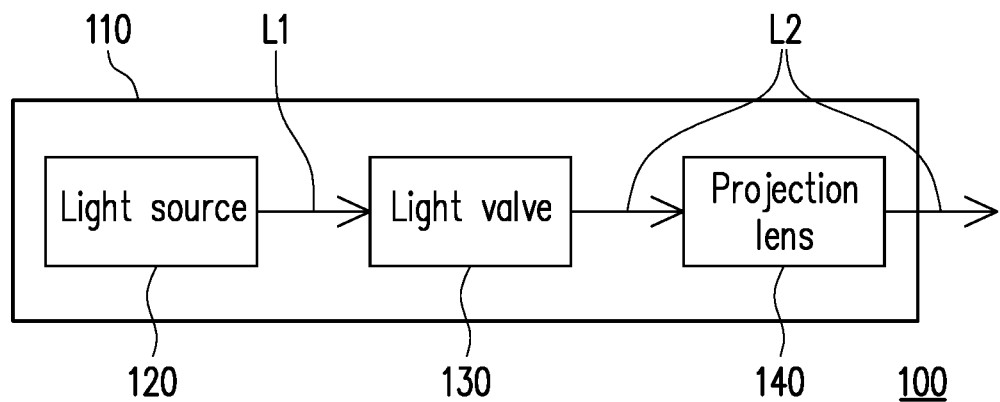
FIG. 1 is a schematic diagram of a projector according to an embodiment of the invention.

FIG. 1 is a schematic diagram of a projector according to an embodiment of the invention. Referring to FIG. 1, the projector 100 of the embodiment includes a main body 110, a light source 120, a light valve 130 and a projection lens 140. The light source 120 is disposed on the main body 110 and adapted to provide an illumination beam L1. The light valve 130 is, for example, a Digital Micromirror Device (DMD), and is disposed on the main body 110 and adapted to convert the illumination beam L1 into an image beam L2. The projection lens 140 is disposed on the main body 110 and adapted to project the image beam L2.

Figure 2:
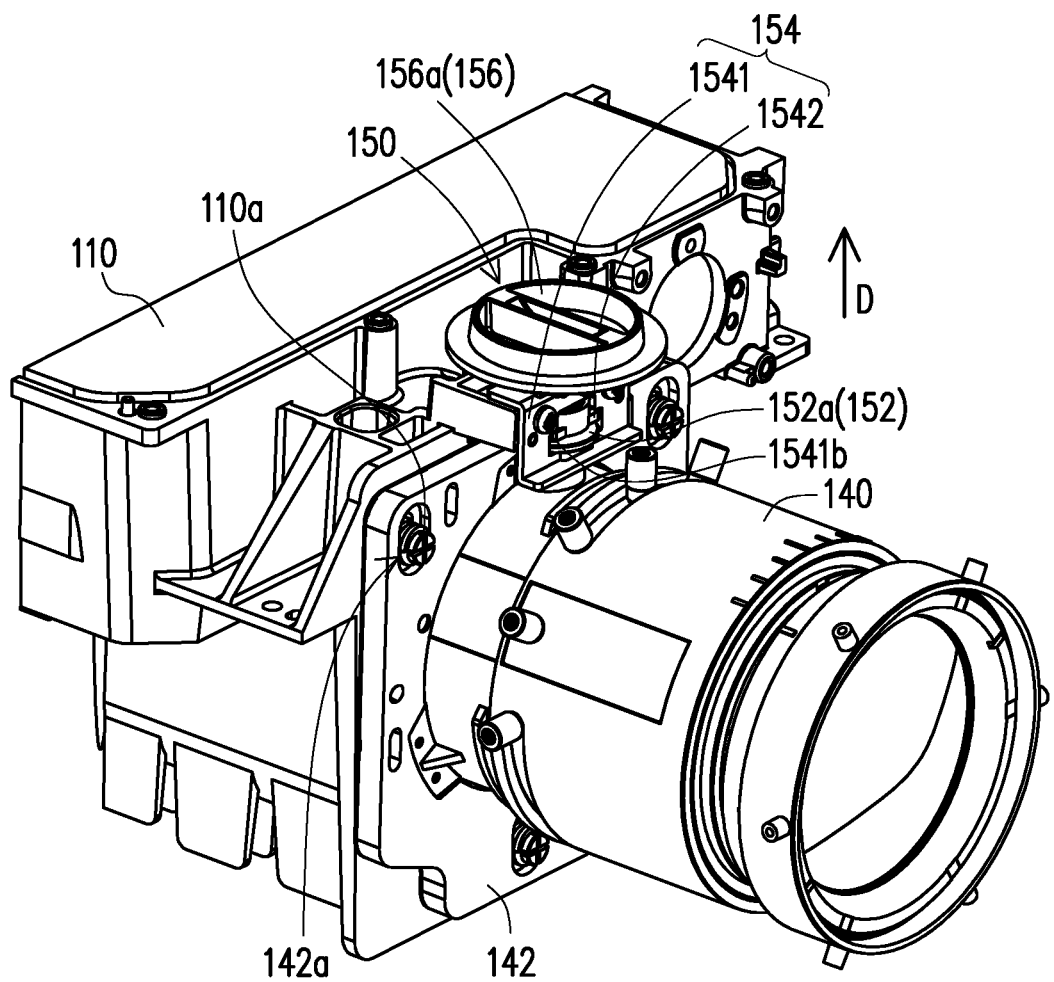
FIG. 2 is a partial three-dimensional structural diagram of the projector in FIG. 1.
Figure 3:
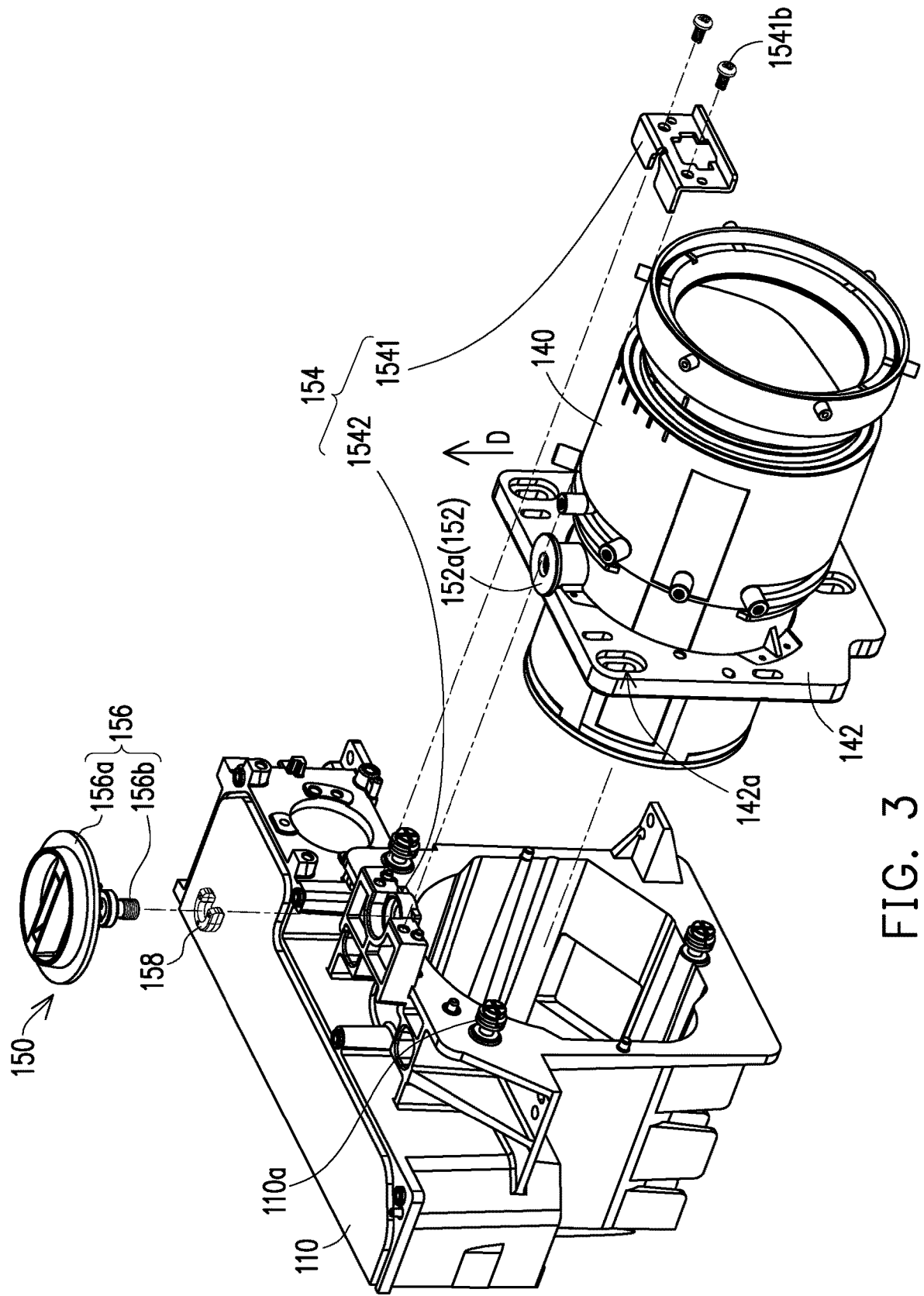
FIG. 3 is an exploded view of the projector in FIG. 2.

FIG. 2 is a partial three-dimensional structural diagram of the projector in FIG. 1. FIG. 3 is an exploded view of the projector in FIG. 2. Referring to FIG. 2 and FIG. 3, a shell structure 142 of the projection lens 140 of the embodiment is, for example, a plastic carrier plate and has multiple sliding slots 142a, and the sliding slots 142a penetrates through multiple limiting screws 110a screwed and locked (locked through threads) to the main body 110 to movably dispose the projection lens 140 on the main body 110 in a moving direction D. The projector 100 further includes a lens adjusting module 150. The lens adjusting module 150 includes a driven member 152, a limiting structure 154 and a rotating member 156. The driven member 152 is connected to the projection lens 140 and has a limiting flange 152a, and the limiting flange 152a is, for example, an annular flange. The rotating member 156 is screwed (jointed through threads) to the driven member 152 and adapted to rotate to drive the driven member 152 and the projection lens 140 to move in the moving direction D. The limiting structure 154 is connected to the main body 110 of the projector 100. The limiting structure 154 is adapted to stop the limiting flange 152a of the driven member 152 to limit a movement range of the driven member 152 in the moving direction D.

In such a disposing manner, the rotating member 156 is not directly screwed to the projection lens 140 but screwed to the driven member 152 on the projection lens 140. When a user applies a force to the rotating member 156 to drive the projection lens 140 to move through rotation of the rotating member 156, a movement travel of the projection lens 140 is not limited by mutual stopping of the projection lens 140 and the limiting screw 110a, and instead, the movement travel of the projection lens 140 is limited by stopping the limiting flange 152a of the driven member 152 by the limiting structure 154. That is, the driven member 152 is screwed with the rotating member 156 and stopped by the limiting structure 154, so that an acting force between the driven member 152 and the limiting structure 156 is directly transmitted to a screwing junction of the driven member 152 and the rotating member 156 and is not excessively transmitted to the shell structure 142 of the projection lens 140, which can avoid the shell structure 142 of the projection lens 140 being stressed and deformed and further avoid bad influence to a projection picture. In addition, the driven member 152 and the limiting structure 156 are components simple rather than complex in structure, and it is unnecessary to adopt a relatively expensive metal (for example, a magnesium alloy) as a high-strength material for the shell structure 142 of the projection lens 140 to solve the problem of deformation, so that the manufacturing cost of the projector 100 can be reduced.

Figure 4:
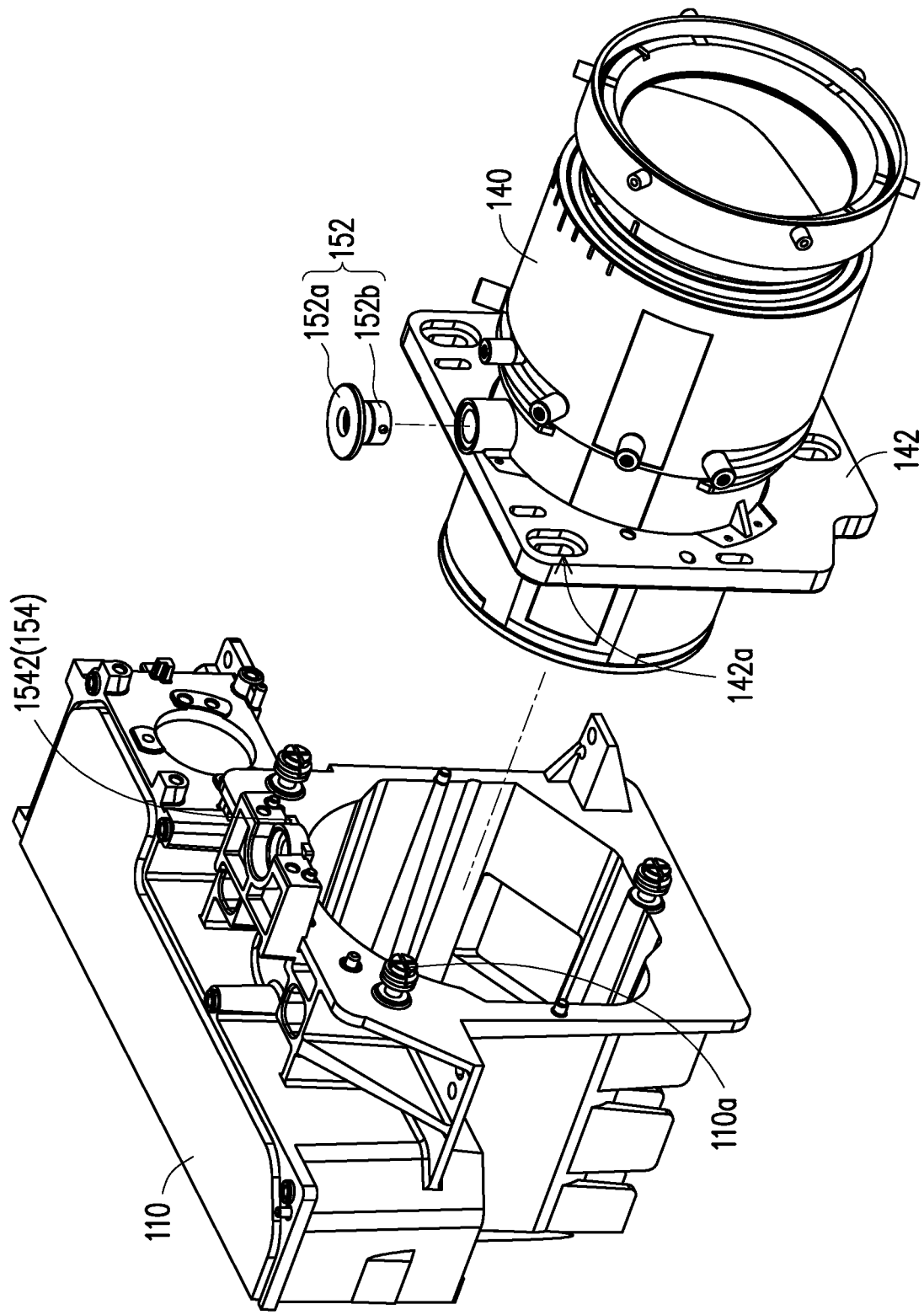
FIG. 4 is an exploded view of part of components of the projector in FIG. 3.

Referring to FIG. 3, in the embodiment, the rotating member 156 includes a knob 156a and a screw rod 156b, the screw rod 156b is screwed to the driven member 152, and the knob 156a is connected to a top end of the screw rod 156b for force application of the user. The lens adjusting module 150 may further include a bushing 158, and the bushing 158 is, for example, a Polyoxymethylene (PMO) bushing and sleeves the screw rod 156b to avoid excessive wear of the screw rod 156b and structures around it. FIG. 4 is an exploded view of part of components of the projector in FIG. 3. Referring to FIG. 4, the driven member 152 of the embodiment is, for example, a buried nail with a washer, and includes a screwing portion 152b, the limiting flange 152a is the washer, the limiting flange 152a is connected to a top end of the screwing portion 152b, and the buried nail is connected to the projection lens 140 in, for example, an ultrasonic welding manner. The screw rod 156b of the rotating member 156 is screwed to the screwing portion 152b of the driven member 152, and an external diameter of the limiting flange 152a is greater than an external diameter of the screwing portion 152b such that the limiting flange 152a is stopped by the limiting structure 154. In the embodiment, a material for the driven member 152 is, for example, stainless steel and thus having high structural strength to avoid damage to threads and scrap. However, in other embodiments, the material for the driven member 152 may be copper or other proper materials. There are no limits made thereto in the invention.

Figure 5:
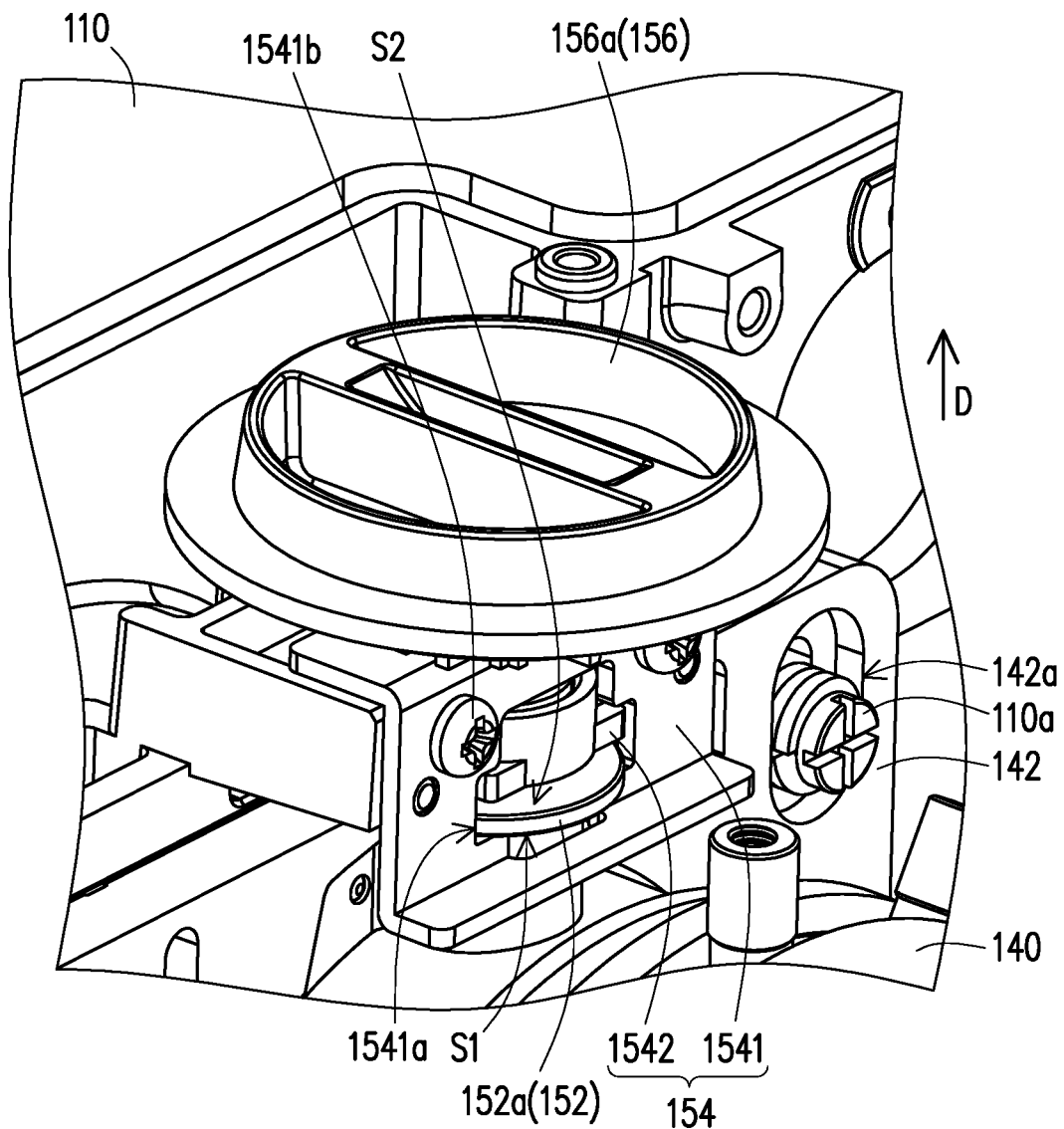
FIG. 5 is a partial enlarged view of the projector in FIG. 2.
Figure 6:
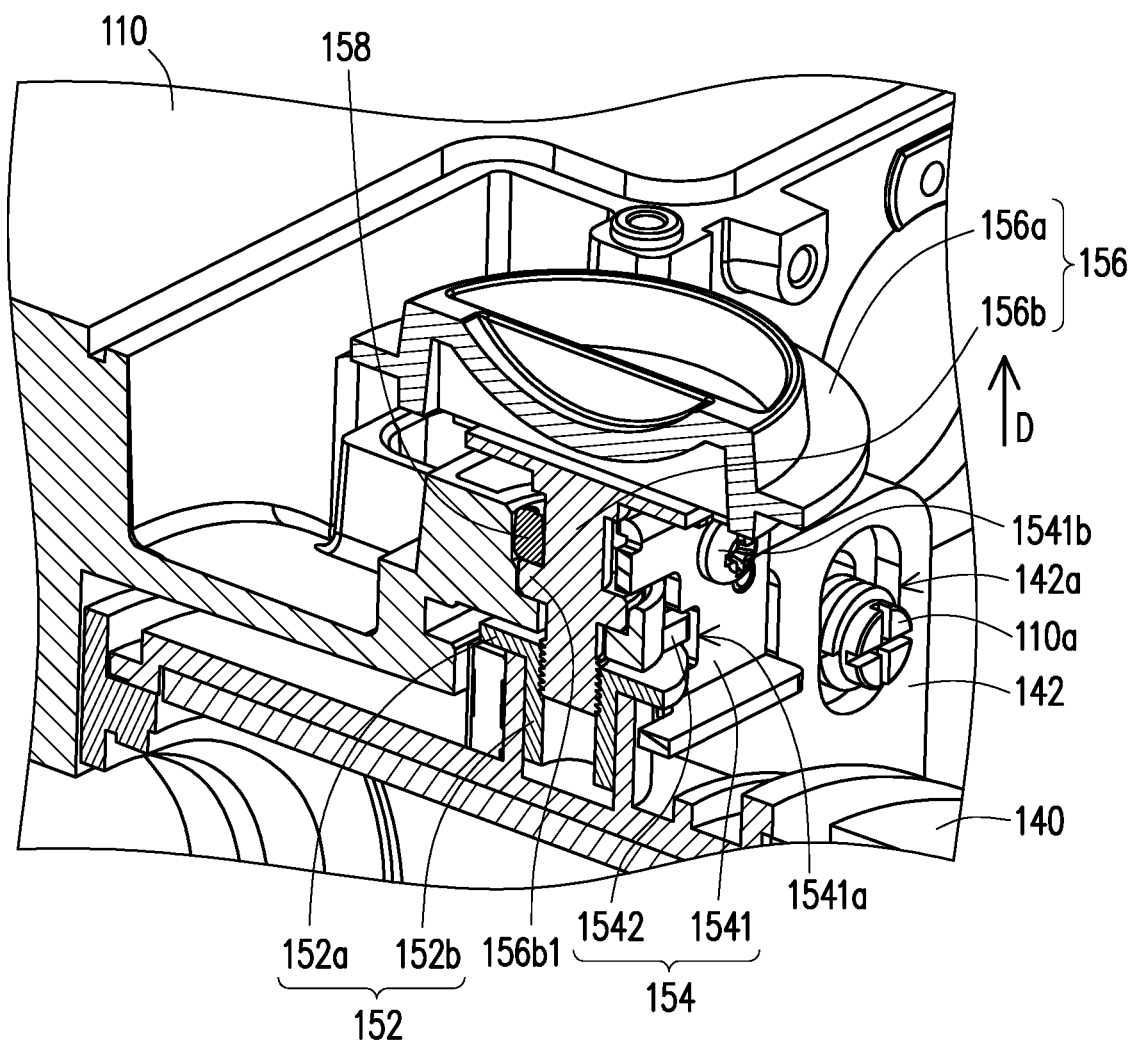
FIG. 6 is a cross-sectional view of the projector in FIG. 5.

FIG. 5 is a partial enlarged view of the projector in FIG. 2. FIG. 6 is a cross-sectional view of the projector in FIG. 5. Referring to FIG. 5 and FIG. 6, the limiting structure 154 of the embodiment includes a frame body 1541, and the frame body 1541 is, for example, a sheet metal part. The frame body 1541 is, for example, fixed to the main body 110 of the projector 100 through two screws 1541b and stopped at a stopping flange 156b1 of the screw rod 156b of the rotating member 156 to prevent the rotating member 156 from moving in the moving direction D. In addition, the frame body 1541 has a limiting open slot 1541a, and the limiting flange 152a of the driven member 152 extends into the limiting open slot 1541a and is stopped by an inner edge of the limiting open slot 1541a. That is, in the embodiment, the limiting open slot 1541a is formed in the existing frame body 1541 for stopping the rotating member 156 to limit the limiting flange 152a of the driven member 152.

More specifically, the limiting flange 152a of the driven member 152 has a first surface S1 (shown in FIG. 5) and a second surface S2 (shown in FIG. 5) that are opposite to each other, the first surface S1 faces the projection lens 140, and the inner edge of the limiting open slot 1541a is adapted to stop the first surface S1. On the other hand, the limiting structure 154 further includes a stopping bump 1542, the driven member 152 is located between the stopping bump 1542 and the projection lens 140, the screw rod 156b of the rotating member 156 penetrates through the stopping bump 1542 to be screwed to the driven member 152, and the stopping bump 1542 is adapted to stop the second surface S2 of the limiting flange 152a.

Figure 7:
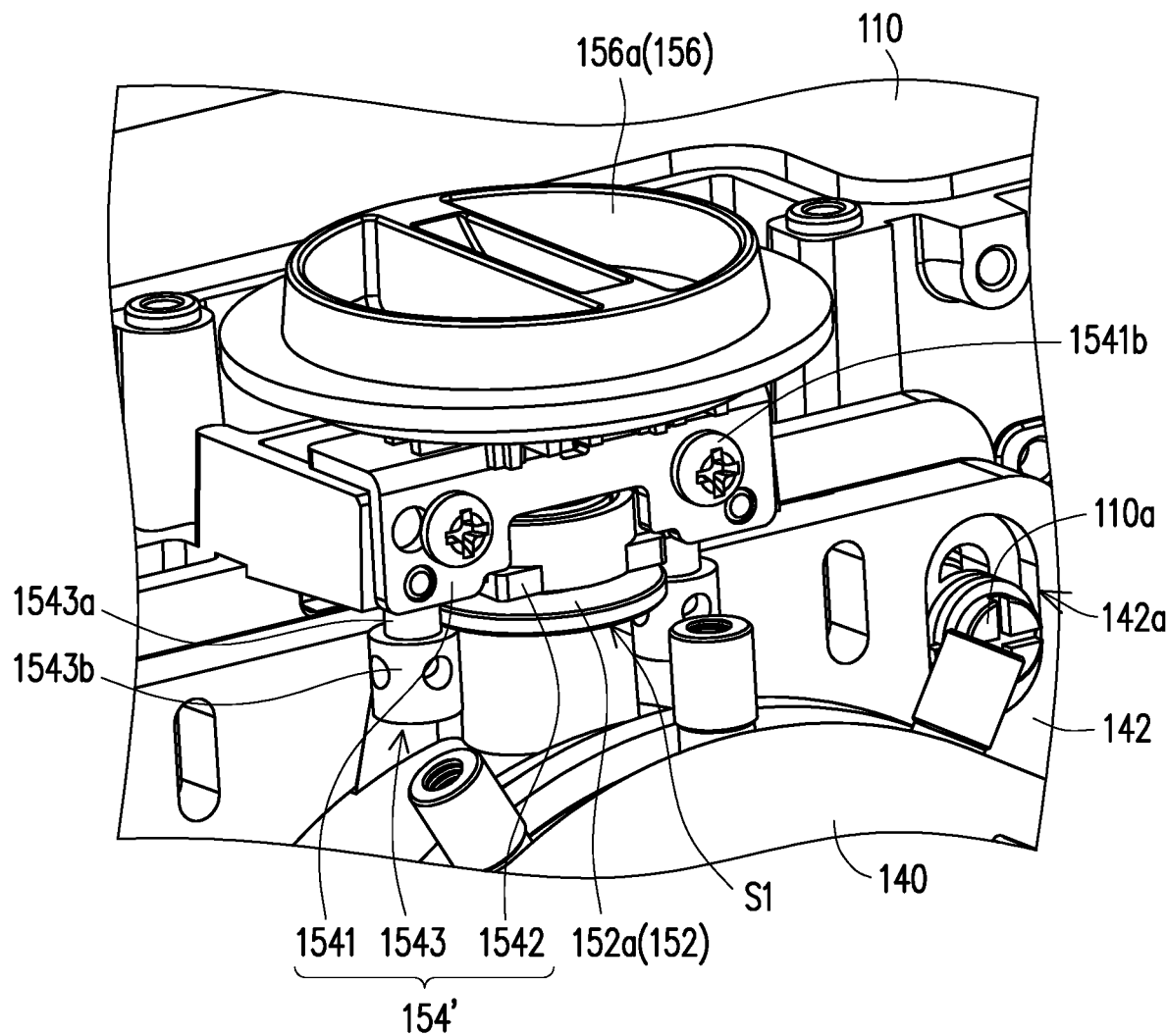
FIG. 7 is a partial three-dimensional diagram of a projector according to another embodiment of the invention.

The form of the limiting structure is not limited in the invention and will be described below with an example through the drawings. FIG. 7 is a partial three-dimensional diagram of a projector according to another embodiment of the invention. The difference between the embodiment shown in FIG. 7 and the aforementioned embodiment is that a frame body 1541' in a limiting structure 154' of the present embodiment does not have the limiting open slot 1541a shown in FIG. 5. Instead, the limiting structure 154' includes at least one stopping component 1543 (there are two in the figure), each stopping component 1543 has a connecting portion 1543a and a stopping portion 1543b, the connecting portion 1543a is connected to the main body 110 in, for example, a screwing and locking or other proper manners, and an external diameter of the stopping portion 1543b is greater than an external diameter of the connecting portion 1543a such that the stopping portion 1543b is adapted to stop the first surface S1 of the limiting flange 152a.

Figure 8:
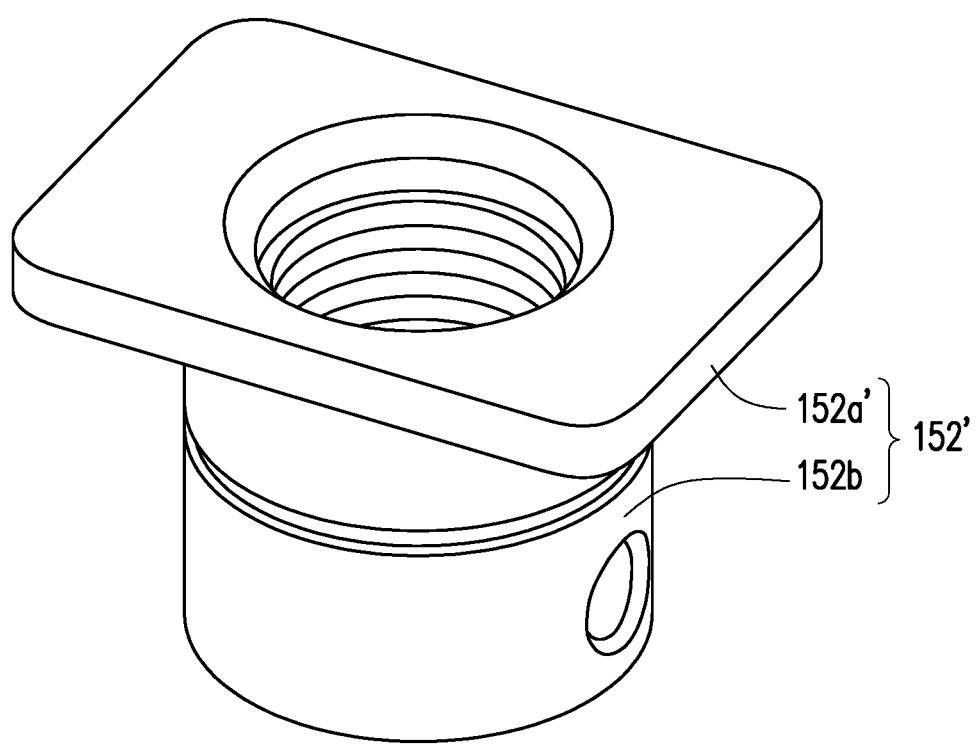
FIG. 8 is a three-dimensional diagram of a driven member according to another embodiment of the invention.
Figure 9:
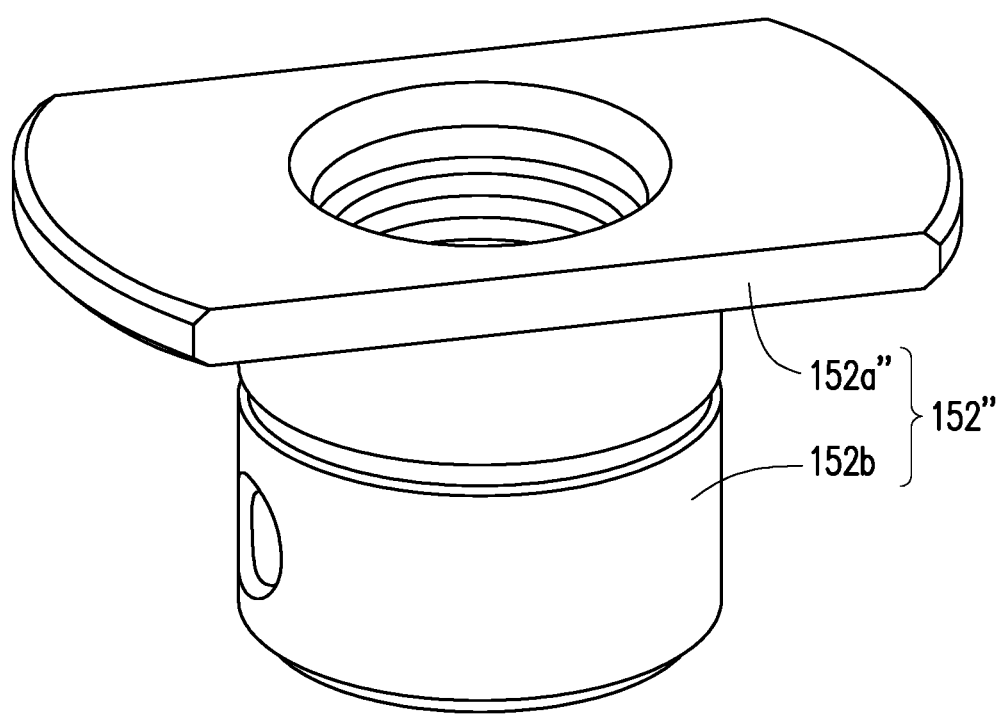
FIG. 9 is a three-dimensional diagram of a driven member according to still another embodiment of the invention.

In addition, the form of the limiting flange is not limited in the invention and will be described below with an example through the drawings. FIG. 8 and FIG. 9 are three-dimensional diagrams of a driven member according to other embodiments of the invention. In the embodiment shown in FIG. 8, a driven member 152' has a limiting flange 152a' and a screwing portion 152b, and the overall shape of the limiting flange 152a' may be rectangular. In the embodiment shown in FIG. 9, a driven member 152" has a limiting flange 152a" and a screwing portion 152b, and the overall shape of the limiting flange 152a' may be a shape formed by two straight lines and two arcs. Besides the shapes shown in FIG. 8 and FIG. 9, the limiting flange may be in any shape that can be adapted to be stopped by the limiting structure 154 or the limiting structure 154'.

Based on the foregoing, the embodiments of the invention have at least one of the following advantages or effects. In the lens adjusting module of the invention, the driven member with the limiting flange is arranged on the projection lens, and the rotating member is not directly screwed to the projection lens but screwed to the driven member of the projection lens. When a user applies a force to the rotating member to drive the projection lens to move through rotation of the rotating member, the limiting flange of the driven member is stopped by the limiting structure to limit a movement travel of the projection lens. That is, the driven member is screwed with the rotating member and stopped by the limiting structure, so that an acting force between the driven member and the limiting structure is directly transmitted to a screwing junction of the driven member and the rotating member and is not excessively transmitted to the shell structure of the projection lens, which may avoid the shell structure of the projection lens being stressed and deformed. In addition, the driven member and the limiting structure are components simple rather than complex in structure, and it is unnecessary to adopt a relatively expensive metal (for example, a magnesium alloy) as a high-strength material for the shell structure of the projection lens to solve the problem of deformation, so that the manufacturing cost of the projector can be reduced.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A projector, comprising a main body, a light source, a light valve, a projection lens and a lens adjusting module, wherein
   the light source is disposed on the main body and adapted to provide an illumination beam;
   the light valve is disposed on the main body and adapted to convert the illumination beam into an image beam;
   the projection lens is movably disposed on the main body in a moving direction and adapted to project the image beam; and
   the lens adjusting module comprises a driven member, a limiting structure and a rotating member, wherein
      the driven member is connected to the projection lens and comprises a limiting flange;
      the limiting structure is connected to the main body; and
      the rotating member is screwed to the driven member and adapted to rotate to drive the driven member and the projection lens to move in the moving direction, and the limiting structure is adapted to stop the limiting flange to limit a movement range of the driven member in the moving direction,
   wherein the limiting structure comprises a frame body, the frame body prevents the rotating member from moving in the moving direction, the frame body comprises a limiting open slot, and the limiting flange extends into the limiting open slot and is stopped by an inner edge of the limiting open slot.

2. The projector according to claim 1, wherein the driven member comprises a screwing portion, the limiting flange is connected to the screwing portion, the rotating member is screwed to the screwing portion, and an external diameter of the limiting flange is greater than an external diameter of the screwing portion.

3. The projector according to claim 2, wherein the limiting flange is connected to a top end of the screwing portion.

4. The projector according to claim 1, wherein the limiting flange is an annular flange.

5. The projector according to claim 1, wherein the limiting flange comprises a first surface and a second surface that are opposite to each other, the first surface faces the projection lens, and the inner edge of the limiting open slot is adapted to stop the first surface.

6. A projector, comprising a main body, a light source, a light valve, a projection lens and a lens adjusting module, wherein
   the light source is disposed on the main body and adapted to provide an illumination beam;
   the light valve is disposed on the main body and adapted to convert the illumination beam into an image beam;
   the projection lens is movably disposed on the main body in a moving direction and adapted to project the image beam; and
   the lens adjusting module comprises a driven member, a limiting structure and a rotating member, wherein
      the driven member is connected to the projection lens and comprises a limiting flange;
      the limiting structure is connected to the main body; and
      the rotating member is screwed to the driven member and adapted to rotate to drive the driven member and the projection lens to move in the moving direction, and the limiting structure is adapted to stop the limiting flange to limit a movement range of the driven member in the moving direction,
   wherein the limiting structure comprises a stopping bump, the driven member is located between the stopping bump and the projection lens, the rotating member penetrates through the stopping bump and is screwed to the driven member, and the stopping bump is adapted to stop the limiting flange.

7. The projector according to claim 6, wherein the limiting flange comprises a first surface and a second surface that are opposite to each other, the first surface faces the projection lens, and the stopping bump is adapted to stop the second surface.

8. A projector, comprising a main body, a light source, a light valve, a projection lens and a lens adjusting module, wherein
   the light source is disposed on the main body and adapted to provide an illumination beam;
   the light valve is disposed on the main body and adapted to convert the illumination beam into an image beam;
   the projection lens is movably disposed on the main body in a moving direction and adapted to project the image beam; and
   the lens adjusting module comprises a driven member, a limiting structure and a rotating member, wherein
      the driven member is connected to the projection lens and comprises a limiting flange;
      the limiting structure is connected to the main body; and
      the rotating member is screwed to the driven member and adapted to rotate to drive the driven member and the projection lens to move in the moving direction, and the limiting structure is adapted to stop the limiting flange to limit a movement range of the driven member in the moving direction,
   wherein the limiting structure comprises at least one stopping component, the at least one stopping component comprises a connecting portion and a stopping portion, an external diameter of the stopping portion is greater than an external diameter of the connecting portion, the connecting portion is connected to the main body, and the stopping portion is adapted to stop the limiting flange.

9. The projector according to claim 8, wherein the limiting flange comprises a first surface and a second surface that are opposite to each other, the first surface faces the projection lens, and the stopping portion is adapted to stop the first surface.

10. A lens adjusting module for a projector, comprising a driven member, a limiting structure and a rotating member, wherein
   the driven member is connected to a projection lens of the projector and comprises a limiting flange;

the limiting structure is connected to a main body of the projector; and the rotating member is screwed to the driven member and adapted to rotate to drive the driven member and the projection lens to move in a moving direction, and the limiting structure is adapted to stop the limiting flange to limit a movement range of the driven member in the moving direction, wherein the limiting structure comprises a frame body, the frame body prevents the rotating member from moving in the moving direction, the frame body comprises a limiting open slot, and the limiting flange extends into the limiting open slot and is stopped by an inner edge of the limiting open slot.

11. The lens adjusting module according to claim 10, wherein the driven member comprises a screwing portion, the limiting flange is connected to the screwing portion, the rotating member is screwed to the screwing portion, and an external diameter of the limiting flange is greater than an external diameter of the screwing portion.

12. The lens adjusting module according to claim 11, wherein the limiting flange is connected to a top end of the screwing portion.

13. The lens adjusting module according to claim 10, wherein the limiting flange is an annular flange.

14. The lens adjusting module according to claim 10, wherein the limiting flange comprises a first surface and a second surface that are opposite to each other, the first surface faces the projection lens, and the inner edge of the limiting open slot is adapted to stop the first surface.

15. A lens adjusting module for a projector, comprising a driven member, a limiting structure and a rotating member, wherein the driven member is connected to a projection lens of the projector and comprises a limiting flange;

the limiting structure is connected to a main body of the projector; and the rotating member is screwed to the driven member and adapted to rotate to drive the driven member and the projection lens to move in a moving direction, and the limiting structure is adapted to stop the limiting flange to limit a movement range of the driven member in the moving direction, wherein the limiting structure comprises a stopping bump, the driven member is located between the stopping bump and the projection lens, the rotating member penetrates through the stopping bump to be screwed to the driven member, and the stopping bump is adapted to stop the limiting flange.

16. The lens adjusting module according to claim 15, wherein the limiting flange comprises a first surface and a second surface that are opposite to each other, the first surface faces the projection lens, and the stopping bump is adapted to stop the second surface.

17. A lens adjusting module for a projector, comprising a driven member, a limiting structure and a rotating member, wherein the driven member is connected to a projection lens of the projector and comprises a limiting flange;

the limiting structure is connected to a main body of the projector; and the rotating member is screwed to the driven member and adapted to rotate to drive the driven member and the projection lens to move in a moving direction, and the limiting structure is adapted to stop the limiting flange to limit a movement range of the driven member in the moving direction, wherein the limiting structure comprises at least one stopping component, the at least one stopping component comprises a connecting portion and a stopping portion, an external diameter of the stopping portion is greater than an external diameter of the connecting portion, the connecting portion is connected to the main body, and the stopping portion is adapted to stop the limiting flange.

18. The lens adjusting module according to claim 17, wherein the limiting flange comprises a first surface and a second surface that are opposite to each other, the first surface faces the projection lens, and the stopping portion is adapted to stop the first surface.

* * * * *